United States Patent [19]

Lahn et al.

[11] Patent Number: 5,160,456
[45] Date of Patent: Nov. 3, 1992

[54] CATALYST/HEAT-TRANSFER MEDIUM FOR SYNGAS GENERATION

[75] Inventors: Gerard C. Lahn, Morristown; Frederick J. Kaiser, Jr., Hanover Township, N.J.; Rocco A. Fiato, Basking Ridge, all of N.J.

[73] Assignee: Exxon Research and Engineering Company, Florham Park, N.J.

[21] Appl. No.: 870,180

[22] Filed: Apr. 16, 1992

Related U.S. Application Data

[63] Continuation of Ser. No. 711,762, Jun. 7, 1991, abandoned.

[51] Int. Cl.$^5$ .............................. C01B 3/30; C01B 3/28
[52] U.S. Cl. ...................................... 252/373; 518/707
[58] Field of Search ......................... 252/373; 518/707

[56] References Cited

U.S. PATENT DOCUMENTS

| Re. 24, 311 | 5/1957 | Mader | 252/373 |
| Re. 32,044 | 12/1985 | Atwood et al. | 252/373 |
| 2,546,606 | 3/1951 | Mayland | 252/373 |
| 4,888,131 | 12/1989 | Goetsch et al. | 252/373 |

Primary Examiner—Marianne M. Cintins
Assistant Examiner—Michael B. Hydorn
Attorney, Agent, or Firm—J. Simon

[57] ABSTRACT

Synthesis gas, hydrogen and carbon monixide, as produced in a fluid-bed or spouted-bed process by reacting methane or a lower alkane with steam and oxygen in the presence of essentially non-catalytic, heat carrying solids with periodic addition of a steam-reforming catalyst for maintaining a level of activity sufficient within 250° F. of the approach to equilibrium.

8 Claims, No Drawings

CATALYST/HEAT-TRANSFER MEDIUM FOR SYNGAS GENERATION

This application is a continuation of application Ser. No. 711,762, filed Jun. 7, 1991, now abandoned.

FIELD OF THE INVENTION

This invention relates to a fluid-bed or spouted-bed process for preparing synthesis gas, carbon monoxide and hydrogen, from lower alkanes, preferably methane, in the presence of both relatively inert solids acting primarily as heat carriers and small amounts, relative to the heat carrying solids, of a catalytic material.

More particularly this invention relates to a process for reacting a lower alkane, e.g., methane, with oxygen in the presence of other gas phase components, preferably steam at elevated temperatures and pressures, and in the presence of both fluidized, relatively inert solids and catalytic solids.

In fluid-bed processes the entire solids inventory of both catalytic and inert solids is in a state of fluidization, while in spouted-bed processes only that portion of the bed through which the gases are injected are in a fluidized state.

BACKGROUND OF THE INVENTION

The production of synthesis gas by either partial oxidation or steam-reforming is well known and there are extensive literature references to these processes. The processes may be used separately or they may be combined. Thus, the steam-reforming reaction is highly endothermic and is described as:

$$CH_4 + H_2O \rightarrow CO + 3H_2 \qquad (1)$$

while the partial oxidation reaction is highly exothermic and is described by:

$$CH_4 + O_2 \rightarrow CO + H_2 + H_2O$$

The combined reaction employing a 2/1 $CH_4/O_2$ feed ratio is described as:

$$2CH_4 + O_2 \rightarrow 2CO + 4H_2$$

In addition to these reactions, the mildly exothermic water gas shift reaction also occurs:

$$CO + H_2O \rightarrow H_2 + CO_2$$

The representation of the combined process shows that the ratio of produced hydrogen to carbon monoxide is 2/1; the approximate stoichiometric hydrogen/carbon monoxide ratio for producing higher hydrocarbons by a hydrocarbon synthesis process, such as the Fischer-Tropsch process over a catalyst with little or no water gas shift activity.

A number of patents illustrate these processes, and U.S. Pat. No. 4,888,131 contains an extensive, but not exhaustive listing thereof.

Fluid bed processes are well known for the advantages they provide in heat and mass transfer characteristics. Such processes allow for substantially isothermal reactor conditions, and are usually effective in eliminating temperature runaways or hot spots; however, with $O_2$ injection while complete elimination of hot spots is impossible although the fluid bed does tend to minimize the intensity thereof. They are not, however, without their disadvantages: catalyst strength or attrition resistance is important for maintaining the integrity of the catalyst and minimizing the formation of fine particles that may be lost from the system, especially those particles not recoverable by use of cyclones and deposited in down stream equipment causing fouling or reverse reactions as temperature is decreased; erosivity, or the tendency to erode equipment must be contained, since attrition resistance is often an inverse function of erosivity.

Additionally, the relatively high temperatures, e.g., above about 1650° F., found in reforming reactions where oxygen is present can cause agglomeration of the catalyst particles leading to lower catalytic efficiency (e.g., lower conversion), larger particles that are more difficult to fluidize, greater wear on equipment due to greater momentum and impact forces, and clogging of lines. For example, a common catalytic material, nickel, even when deposited in small amounts on a suitable carrier, e.g., less than about 5 wt. % nickel on a support, tends to soften at reaction temperatures (due to its reactivity with the support phase with concomitant formation of reactive/lower melting mono- and polymetalic oxide phases), which become sticky, and generally lead to particle agglomeration. Particle agglomeration, in fact, tends to increase as the amount of nickel present in the catalyst bed increases or as the Ni containing phase is subjected to multiple oxidizing and reducing cycles as it is transported through the fluid bed. The behavior of $Ni/Al_2O_3$ in $H_2$ and steam rich environments has been reported, E. Ruckenstein et al, *J. Catalysis* 100 1-16 (1986). Thus, maintaining the amount of nickel at rather low levels in the catalyst bed minimizes particle agglomeration. On the other hand sufficient nickel is required for providing economical feed conversions to synthesis gas, i.e., within about 200° F. approach to equilibrium, thereby minimizing the level of $CH_4$ exiting the syngas generation zone.

Processes similar to fluid-bed steam-reforming processes for the preparation of synthesis gas are also illustrated by U.S. Pat. No. 4,758,375 and European patent publication 0163 385 B1 relating to spouted-bed technology and the use of inert materials in the bed.

An object of this invention, therefore, is taking advantage of fluid-bed or spouted-bed processes for the production of synthesis gas from lower alkanes, e.g., $C_1$–$C_4$, feeds while substantially eliminating particle growth at elevated temperatures. Another object of this invention is approaching a minimum nickel concentration in the reactor while continuing to provide economic conversion levels.

SUMMARY OF THE INVENTION

These objects and other objects of this invention are met by conducting a fluid-bed or spouted-bed, steam-reforming, partial-oxidation process involving a lower alkane feed, e.g., methane, at elevated temperatures in the presence of non-catalytic or essentially non-catalytic, heat carrying solids, and periodically injecting sufficient catalytic material to maintain conversion levels of less than or equal to a 250° F. approach to equilibrium. The invention thus minimizes the total amount of catalytic material in the fluid-bed reaction zone at any point in time, thereby minimizing any agglomeration or sintering effects due to the presence of catalytic material, and allows for conducting the reaction at higher temperatures approaching the heat limit of the non-catalytic solids. Higher operating temperatures, in turn, provide better conversion of feed to synthesis gas.

DETAILED DESCRIPTION OF THE INVENTION

The steam-reforming, partial-oxidation process contemplated herein operates in a reactor wherein at least one part of the solids inventory is in a fluidized state and wherein heat carrying or heat transfer materials are suspended in a flowing fluid at average bed temperatures above about 1650° F., preferably at or above about 1700° F. Reaction pressures may vary widely, for example, from about atmospheric pressure to about 100 atmospheres. Where the product synthesis gas will be used in hydrocarbon synthesis reactions, the pressure may be chosen so that intermediate recompression of the synthesis gas can be avoided and the synthesis gas will flow directly, after some product separation and fines recovery, to the hydrocarbon synthesis reactor, e.g., at pressures of about 10-50 atmospheres, preferably 10-40 atmospheres, more preferably 20-40 atmospheres. By virtue of this invention the high end of the temperature range is no longer limited by catalyst disintegration or catalyst agglomeration and the temperature may range to within about 50° F. of the softening point of the heat carrying, essentially non-catalytic materials. (By non-catalytic we mean that the steam-reforming or partial oxidation process is either not catalyzed or only poorly catalyzed by the heat carrying materials. Thus, the heat carrying solids are inert or substantially inert for this steam-reforming or partial-oxidation reaction.) More preferably, however, average bed temperatures may range from about 1650° F. to 2000° F., still more preferably from about 1700° F. to about 1800° F. at the preferred operating pressure of 20-40 atm. As the preferred pressure decreases to about 10-20 atm, the preferred operating temperature will be decreased accordingly to maintain desired methane conversion.

The feed material to be reformed is any reformable alkane, usually a lower alkane, e.g., $C_1$-$C_4$, preferably comprising methane or natural gas which contains a high concentration of methane, e.g., greater than about 70% methane, preferably greater than 80% methane, more preferably, greater than 90% methane based on the total carbon content of the feed. Such feed gases will likely contain up to about 10% ethane, up to about 3% propane and trace amounts of $C_4$-$C_8$. Condensate and known contaminants, such as hydrogen sulfide, in the gas should be removed, e.g., by well known processes. Typical feeds may also contain some $CO_2$ and nitrogen as well as some CO, $H_2$, olefins and oxygenated products from recycle operations, e.g., from Fischer-Tropsch processes.

The heat carrying solids may be any fluidizable material that maintains its integrity at reaction conditions. These materials may be Group II metal oxides, rare earth oxides, alpha alumina, modified alpha aluminas, or alpha alumina containing oxides.

The heat carrying materials are generally attrition resistant at reaction conditions and have a mean particle diameter ranging from about 20 to 150 microns, preferably 30-150 microns, more preferably 30-120 microns. Alumina materials, especially fused tabular alumina, described in U.S. Pat. Nos. 4,888,131 and 4,952,389 are particularly applicable for heat carrying materials and the description of the alumina materials therein is hereby incorporated herein by reference. Generally, these materials are at least about 98% alpha alumina with substantially no silica. Silica tends to volatilize to $Si(OH)_4$ at reaction temperatures, impairing the integrity of the particle. Silica content is, therefore, less than about 1 wt. %, preferably less than about 0.5 wt. %. Preferred materials are alpha aluminas, tabular or fused, and rare earth stabilized alpha aluminas, e.g., containing about 0.1 to 1.0 wt. % rare earth.

Materials useful as heat carrying solids generally have rather low surface areas, e.g., less than about 2 $m^2$/gm, usually less than about 1 $m^2$/gm.

The heat carrying materials are substantially inert or non-catalytic with respect to the steam-reforming reaction. Consequently, even though not preferred, some of these materials may be comprised of spent or deactivated catalyst. The reaction itself may lead to deactivation of the catalyst, particularly nickel containing catalysts, which may then be used as heat carrying solids. The deactivation rate of an individual catalyst will be a function of its chemical and physical properties as well as the synthesis gas generation operating conditions. As a given catalyst is being used, it will be possible to determine the precise deactivation rate, and from that the rate at which fresh catalyst will need to be added.

The catalyst used herein may be any conventional steam-reforming catalyst, or autothermal or combined reforming catalyst. Such catalysts can be described as being selected from the group consisting of uranium, Group VII metals, and Group VIII noble and non-noble metals. The metals are generally supported on inorganic refractory oxides similar to the heat carrying materials already described Preferred catalyst metals are the Group VIII metals, particularly nickel. In the case of nickel, any nickel containing material is useful, e.g., nickel supported on alpha alumina, nickel aluminate materials, nickel oxide, and preferably a supported nickel containing material.

The catalyst may have a similar particle size distribution as that found in the heat carrying material or it may have a somewhat larger particle size, e.g., from 70-250 microns or larger. The larger particles may be more sintering resistant. Even though more sintering prone, more finely divided catalyst, <70μ, may be desired because their fluid dynamic properties make them more accessible to the gas phase reactants.

The amount of catalyst in the bed is that sufficient to bring the activity to within 250° F. of equilibrium, preferably to within 100° F. of equilibrium, more preferably to within 50° F. of equilibrium when the overall reaction is being carried out at relatively high pressures, e.g., 20-40 atm where achieving high levels of $CH_4$ conversion would otherwise be difficult.

The steam-reforming reaction is equilibrium limited. That is, at any particular reaction temperature an equilibrium conversion can be calculated based on the partial pressure of the gaseous components of the system and the relative rate constants of the forward and reverse reactions. This calculation is easily established and carried out by one skilled in the art. However, calculating the equilibrium conversion at any particular temperature is not a part of this invention. The only importance it plays is that the activity of the catalyst is such that the conversion of feed, e.g., methane, to synthesis gas is such that it is equal or greater to that which would be obtained within 250° F. approach to the equilibrium conversion for a particular temperature. Thus the approach to equilibrium is simply another way of measuring effective activity of the catalyst-heat transfer solids mixture.

In order to minimize the ability of a catalyst, e.g., nickel containing catalyst, to cause particle agglomeration, the amount of nickel containing particles in the reaction bed should be minimized while maintaining sufficient nickel for providing adequate catalyst activity. Consequently, the nickel loading on a supported particle should be reasonably high, for example, 1 to 20 wt. %, bearing in mind that the support usually has a low surface area, with little porosity and can hold relatively low amounts of catalytic metal. The nickel loading in the bed which is constituted of heat carrying, relatively inert particles and supported nickel, catalytic particles should be at least about 0.01 wt. % based on total bed solids, preferably at least about 0.02 wt. %, more preferably about 0.02 wt. % to about 3.0 wt. %, and most preferably about 0.2 to 1.5 wt. %. This loading is for nickel acting as a catalyst for the steam reforming reaction, i.e., active nickel, since there may be some totally or substantially deactivated nickel, i.e., spent nickel, in the reaction zone acting as a heat carrying solid. Since the nickel loading on the catalytic particle may vary widely, as stated above, the amount of nickel containing catalytic solids can be easily calculated based on the total bed weight the weight of nickel in the total bed, and the nickel loading on the nickel containing solids.

The catalyst containing material may be added continuously to the fluid-bed or may be added at regular intervals. Significant increases or decreases in the weight of the fluidized material should be avoided so as not to disturb the fluidizing characteristics of the bed. Thus, the rate and timing of the addition of catalyst should be, generally, balanced by the normal losses from any fluid-bed system, that is, fines or materials of less than about 20 microns mean diameter which cannot be trapped by cyclones for return to the bed, and other materials, such as spent catalyst that is removed from time to time from the fluid-bed.

Regardless of whether active catalytic material is continuously fed to the fluid-bed or spouted-bed or injected at regular or irregular intervals, the rate and timing of catalyst addition is such that conversion of feed, e.g., methane, and feed leak or methane leak, i.e., the volume % of unconverted feed or methane in the product gases, is within 250° F. of equilibrium. One skilled in the art can easily picture a plot of activity (ordinate) v. time (abscissa) where the activity line is relatively horizontal (constant addition of fresh or active catalyst) or effects a saw tooth-type curve (periodic addition of fresh or active catalyst where activity decreases with time and then jumps with each injection of catalyst).

The unconverted feed or methane leaving the fluid-bed as product gas is usually less than about 10%, preferably less than about 8%, more preferably less than about 5% based on the total level of the hydrocarbon or methane being fed to the reactor.

The fluidized reaction zone may contain a fluid bed of particles or a spouted bed of particles. The design and engineering of fluid-bed or spouted-bed reactors for the conversion of methane or lower alkanes to synthesis gas is easily accomplished with relationships and techniques well known in the art, see, e.g., O. Levenspiel and K. Dunii, Fluidization Engineering, Wiley, New York (1969) and references therein and see K. Mathane and N. Epsteain, Spouted Beds, Academic Press, New York, 1974 and references therein. Fluid bed processes are preferred.

The steam-reforming partial-oxidation reaction is carried out in the presence steam and oxygen. The alkane feed to steam molar ratio is at least about 1 preferably about 1 to 3, more preferably 1.5 to 2.5. The oxygen to alkane feed molar ratio is about 0.2 to 1.0, preferably 0.4 to 0.6. The $O_2$ is added to provide the sensible heat for reactants and to maintain the overall reaction temperature at a desired level. When oxygen is employed, the alkane feed and oxygen should be separately diluted with steam and/or $CO_2$ and preheated before injection into the fluidized bed reaction zone. The ratio of steam to $CO_2$ is chosen so as to achieve the desired $H_2/CO$ product ratio.

EXAMPLE

A refractory lined three foot diameter fluid-bed reactor was charged with about 14 klb of 55–65 micron average diameter fused alumina and 50 lb. of an 8 wt. % Ni catalyst supported on 0.3 wt. % $La-Al_2O_3$ support, 40–100 micron average diameter. The bed of heat carrying solids and Ni catalyst contained ca. 0.025–0.03 wt. % nickel. The system was initially brought to temperature via in situ combustion of methane until the desired operating temperature was approached.

Natural gas plus steam and carbon dioxide were introduced at the bottom of the reactor through an 8 inch o.d. center post with four 1.04 inch i.d. tubes angled 30 degrees downward from horizontal. These tubes were symmetrically disposed around the outer circumference of the post. This feed was simultaneously introduced through four similar tubes positioned symmetrically around the vessel wall.

Oxygen together with nitrogen, carbon dioxide, other inert diluent gases or mixtures thereof were introduced through eight nozzles evenly spaced around the reactor wall at a level about 3 feet above the methane feed zone. Each nozzle terminates in three 0.277 inch i.d. tubes; the center tube is aimed at the vertical center line of the reactor at an angle 30 degrees below horizontal. The outer tubes are angled 30 degrees to either side of the center tube and are on a horizontal axis.

The system was operated for about ten days after which time an additional 325 lb. batch of the Ni reforming catalyst was added to the bed to give an overall Ni loading level of 0.2–0.3 wt. %. Solids that were eluded from the bed were recycled so as to maintain a nearly constant inventory during this operating period.

Total feed rates (moles/hr) to the reactor were: 150 methane, 108 steam, 71 oxygen, 48 carbon dioxide and less than 10 of nitrogen. The system was operated at an average bed temperature of 1700° F. at a pressure of 360 psia over a 15 day period during which nearly stable activity, i.e., little deactivation, was observed and total solids attrition as measured by the formation of particles with less than 38 microns average diameter and agglomeration as measured by the formation of particles with over 90 microns average diameter were minimal.

On-line analysis showed 80–95% overall conversion with the outlet stream containing hydrogen and carbon monoxide with an $H_2/CO$ molar ratio of ca. 1.9–2.0, steam, carbon dioxide and nitrogen. This stream was shown to have less than 5% volume of methane present at the end of the 15 day operating period.

This example demonstrates the utility of a fluid-bed comprised of non-catalytic heat carrying solids with low levels of a nickel containing steam reforming catalyst to produce synthesis gas from methane with high overall efficiency.

In the example, the amount of nickel added to the bed was more than sufficient to maintain the conversion to well within a 100° F. approach to equilibrium. Consequently, the rate of deactivation, e.g., the activity half life, is rather relatively long for this amount of nickel. However, with increasing time of operation the activity will continue to fall, and another injection of nickel containing solids will be required to maintain a desired conversion and overall approach to equilibrium.

If the amount of nickel added to the system was less than shown in the example, the rate of deactivation would increase faster with time and another nickel addition would become necessary in a shorter time period. Thus, the periodicity of nickel addition is a function of the amount of nickel added to the bed, and the deactivation rate with additional nickel being required to maintain the desired activity and overall approach to equilibrium.

What is claimed is:

1. In a steam reforming-partial oxidation process for converting, in a fluidized bed or spouted bed reaction zone, a feed gas comprising methane to a product comprising unconverted methane, hydrogen and carbon monoxide at elevated temperatures, in the presence of oxygen, non-catalytic heat carrying solids and catalytic solids, the catalytic solids deactivating during the reaction, the improvement comprising periodically adding to the reaction zone sufficient nickel containing steam reforming catalyst such that the unconverted methane in the product is maintained at no more than a 250° F. approach to equilibrium.

2. The process of claim 1 wherein the reaction zone is a fluidized bed reaction zone.

3. The process of claim 2 wherein the approach to equilibrium is no more than about 100° F.

4. The process of claim 2 wherein the nickel loading is at least about 0.01 wt. % based on total bed solids.

5. The process of claim 2 wherein the heat carrying solids comprise alumina.

6. The process of claim 5 wherein the alumina is stabilized with a rare earth element or its oxide.

7. The process of claim 2 wherein the reaction temperature is at least 1650° F., and reaction pressure ranges from about 10-50 atmospheres.

8. The process of claim 2 wherein the loading of nickel containing catalyst is at least about 0.2 wt. % based on total bed solids and the approach to equilibrium is no more than about 100° F.

* * * * *